US012082614B2

(12) United States Patent
Jiang et al.

(10) Patent No.: US 12,082,614 B2
(45) Date of Patent: Sep. 10, 2024

(54) HEATING BODY AND ELECTRONIC ATOMIZATION DEVICE HAVING THE SAME

(71) Applicant: Shenzhen Smoore Technology Limited, Shenzhen (CN)

(72) Inventors: Zhenlong Jiang, Shenzhen (CN); Xiaoping Li, Shenzhen (CN); Pei Li, Shenzhen (CN); Changyong Yi, Shenzhen (CN); Lingrong Xiao, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 523 days.

(21) Appl. No.: 17/395,456

(22) Filed: Aug. 6, 2021

(65) Prior Publication Data

US 2022/0039471 A1 Feb. 10, 2022

(30) Foreign Application Priority Data

Aug. 7, 2020 (CN) ......................... 202010791572.1

(51) Int. Cl.
*H05B 3/28* (2006.01)
*A24F 40/46* (2020.01)

(52) U.S. Cl.
CPC ............... *A24F 40/46* (2020.01); *H05B 3/28* (2013.01); *H05B 2203/021* (2013.01)

(58) Field of Classification Search
CPC ...... A24F 40/46; H05B 3/28; H05B 2203/021
USPC .......................................................... 131/329
See application file for complete search history.

(56) References Cited

U.S. PATENT DOCUMENTS

| | | | | |
|---|---|---|---|---|
| 9,888,727 B2 * | 2/2018 | Li | ........................ | H05B 1/0244 |
| 10,045,563 B2 * | 8/2018 | Li | ........................ | H01R 13/502 |
| 2017/0172214 A1 * | 6/2017 | Li | ........................... | A24F 40/46 |
| 2021/0307397 A1 | 10/2021 | Liu | | |

FOREIGN PATENT DOCUMENTS

| | | | | |
|---|---|---|---|---|
| CN | 101827466 A * | 9/2010 | | |
| CN | 205358219 U * | 7/2016 | ............. | A24F 40/44 |
| CN | 205648910 U * | 10/2016 | ............. | A24F 13/00 |

(Continued)

OTHER PUBLICATIONS

European Examination Report, European Application No. 21189788.9, mailed Jul. 5, 2023 (4 pages).

(Continued)

*Primary Examiner* — Peter G Leigh

(57) ABSTRACT

A heating body includes: a first heat-conducting substrate, a second heat-conducting substrate, and a heating element. A side of the first heat-conducting substrate defines a recess. The second heat-conducting substrate and the first heat-conducting substrate cooperatively forms a substrate having a receiving space. The heating element is received in the receiving space and comprising an electrically conductive body and an insulating layer wrapping an outer surface of the electrically conductive body, such that the heating element is insulated from the substrate. The heating body has a simple structure and can be easily assembled. Heat generated by the heating body may be distributed more uniformly.

20 Claims, 6 Drawing Sheets

(56) References Cited

FOREIGN PATENT DOCUMENTS

| | | | | | |
|---|---|---|---|---|---|
| CN | 108185529 | A | * | 6/2018 | |
| CN | 108308710 | A | * | 7/2018 | ........... A24F 47/008 |
| CN | 108323818 | A | * | 7/2018 | ........... A24F 47/008 |
| CN | 108338416 | A | | 7/2018 | |
| CN | 108552599 | A | * | 9/2018 | |
| CN | 208096015 | U | * | 11/2018 | |
| CN | 109068417 | A | | 12/2018 | |
| CN | 109077361 | A | * | 12/2018 | ............. A24F 40/46 |
| CN | 209390389 | U | | 9/2019 | |
| CN | 209403578 | U | * | 9/2019 | |
| CN | 110839965 | A | * | 2/2020 | |
| CN | 111134374 | A | | 5/2020 | |
| JP | S5365943 | | * | 6/1978 | ............... H05B 3/06 |
| JP | S5365943 | U | | 6/1978 | |
| WO | WO-2020057045 | A1 | * | 3/2020 | ............. A24F 40/46 |

OTHER PUBLICATIONS

European Search Report,Application No. 21189788.9,mailed Dec. 15, 2021(7 pages).

* cited by examiner

HEATING BODY AND ELECTRONIC ATOMIZATION DEVICE HAVING THE SAME

CROSS REFERENCE TO RELATED APPLICATIONS

The present application claims the foreign priority of the Chinese patent application No. 202010791572.1, filed on Aug. 7, 2020 in the China National Intellectual Property Administration, and the entire contents of which are hereby incorporated by reference in their entireties.

TECHNICAL FIELD

The present disclosure relates to the field of electronic atomization devices, and in particular, to an electronic atomization device and a heating body of the electronic atomization device.

BACKGROUND

In the art, an electronic atomization device, such as an e-cigarette, may be configured with an inserted heating body. At least a part of the heating body may be inserted into tobacco, such that the tobacco may be heated and atomized. In the art, resistance paste may be directly screen printed on a ceramic substrate or a metal sheet having an insulating surface to form a circuit. The heating body formed in this way may not be rigid enough. Therefore, the circuit may easily be damaged, broken and peeled off when the substrate is deformed. Further, only one side of the heating body may heat. Therefore, heating temperatures of two opposites sides of the heating body may be unequal.

SUMMARY OF THE DISCLOSURE

The present disclosure provides an electronic atomization device and a heating body of the electronic atomization device.

According to a first aspect, a heating body is provided and includes the following elements.

A first heat-conducting substrate is configured. A side of the first heat-conducting substrate defines a recess.

A second heat-conducting substrate is configured. The second heat-conducting substrate and the first heat-conducting substrate cooperatively form a substrate having a receiving space.

A heating element is configured and received in the receiving space and comprises an electrically conductive body and an insulating layer wrapping an outer surface of the electrically conductive body, such that the heating element is insulated from the substrate.

According to a second aspect, an electronic atomization device includes a heating body and an atomization device body.

The heating body is mounted on the atomization device body. The atomization device body is provided with a power supply. The power supply is electrically connected to the heating body to provide power to the heating body. The heating body is configured to heat and atomize an object that is to be heated. The heating body is the heating body mentioned above.

BRIEF DESCRIPTION OF THE DRAWINGS

In order to more clearly illustrate the technical solutions of the embodiments of the present disclosure, the drawings for the description of the embodiment will be described in brief Obviously, the drawings in the following description are only some of the embodiments of the present disclosure. For a person of ordinary skill in the art, other drawings may be obtained based on the following drawings without any creative work.

DETAILED DESCRIPTION

Figure 1:
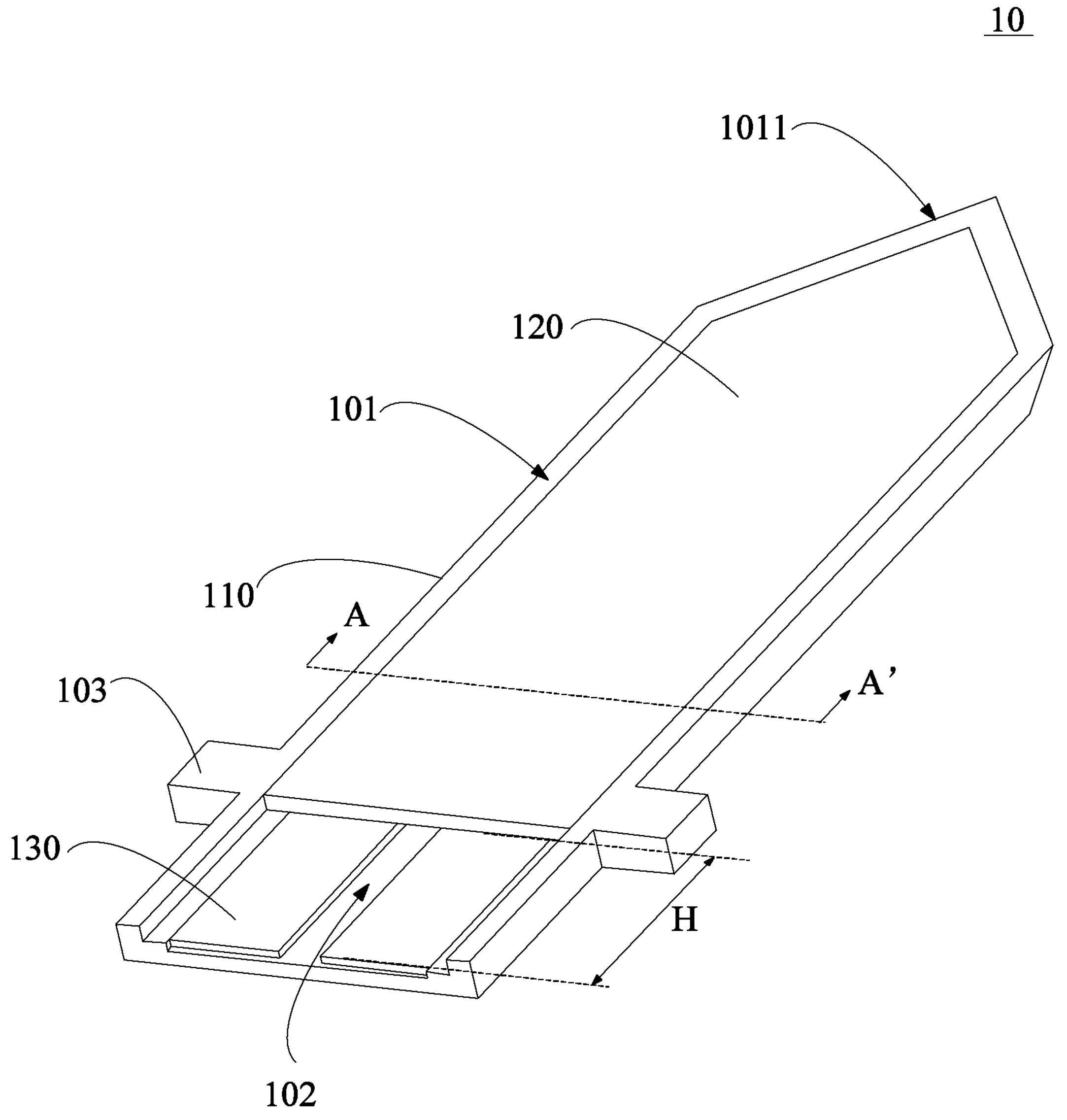
FIG. 1 is a structural schematic view of a heating body according to an embodiment of the present disclosure.

Technical solutions of the embodiments of the present disclosure will be clearly and comprehensively described by referring to the accompanying drawings. Obviously, the embodiments described herein are only a part of, but not all of, the embodiments of the present disclosure. Based on the embodiments in the present disclosure, all other embodiments obtained by a person of ordinary skill in the art without any creative work shall fall within the scope of the present disclosure.

It should be noted that directional indications if present (such as up, down, left, right, front, back, . . . ) in the embodiments of the present disclosure are only expressed to explain relative positional relationships and movement between components in a particular attitude (as shown in the drawings). When the particular attitude is changed, the directional indications shall also be changed accordingly.

In addition, when using expressions "first", "second", and the like in the embodiment of the present disclosure, the expressions "first", "second", and the like are used for descriptive purposes only, and shall not be interpreted as indicating or implying relative importance or implicitly specifying the number of an indicated technical feature. Therefore, features defined by "first" and "second" may explicitly or implicitly include at least one of the such feature. In addition, technical solutions of various embodiments may be combined with each other, but only on the basis that the technical solutions can be achieved by a person of ordinary skill in the art. When combination of technical solutions appears to be contradictory or unachievable, such combination of technical solutions shall be interpreted as inexistence and excluded from the scope of the present disclosure.

Figure 2:
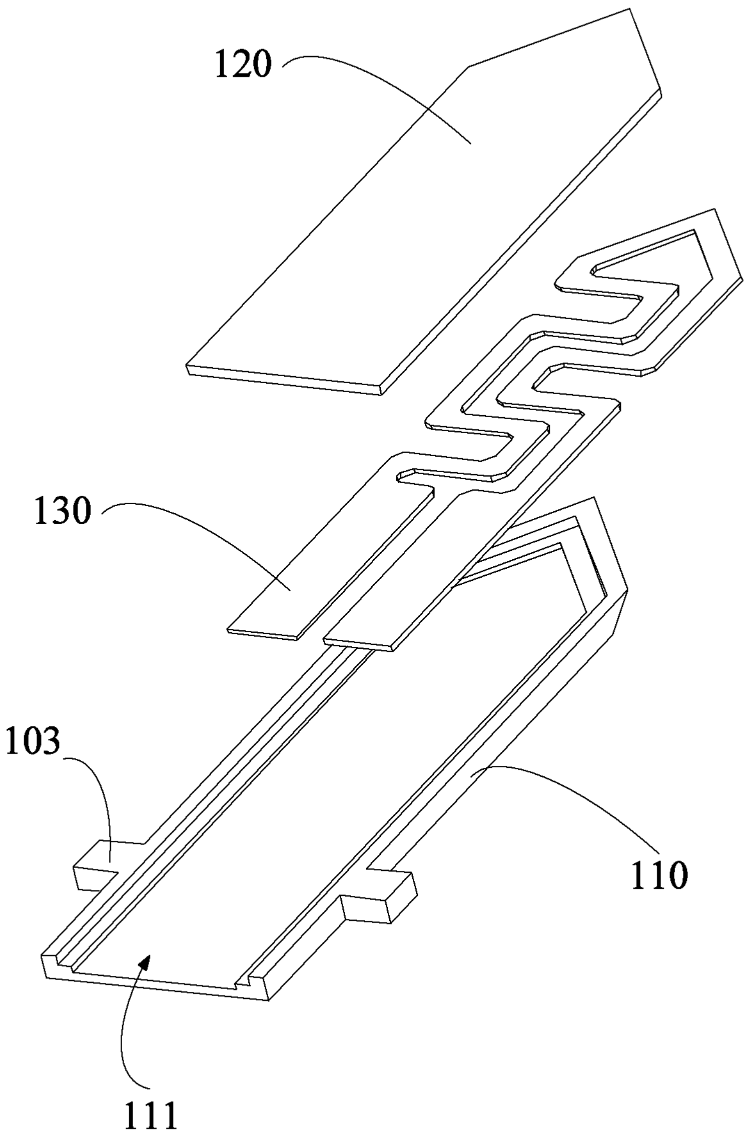
FIG. 2 is an exploded view of the heating body shown in FIG. 1 according to an embodiment of the present disclosure.

FIG. 1 is a structural schematic view of a heating body according to an embodiment of the present disclosure, and FIG. 2 is an exploded view of the heating body shown in FIG. 1 according to an embodiment of the present disclosure.

A heating body 10 may include a first heat-conducting substrate 110, a second heat-conducting substrate 120, and a heating element 130. A side of the first heat-conducting substrate 110 may define a recess 111. The second heat-conducting substrate 120 may cover an at least a part of an opening of the recess 111, such that the second heat-conducting substrate 120 and the first heat-conducting substrate 110 may cooperatively form a substrate 101 having a receiving space. The heating element 130 may be at least partially received in the receiving space. The heating element 130 may include an electrically conductive body and an insulating layer wrapping an outer surface of the electrically conductive body. In this way, the heating element 130 may be insulated from the substrate 101 formed by the first heat-conducting substrate 110 and the second heat-conducting substrate 120.

Further, in the present embodiment, the heating body 10 may be at least partially inserted into tobacco to heat and atomize the tobacco or e-liquid. Smoothness of outer surfaces of the first heat-conducting substrate 110 and the second heat-conducting substrate 120 may be ensured, which may prevent the tobacco from adhering to the outer surfaces of the second heat-conducting substrate 120 and the first heat-conducting substrate 110.

In the present embodiment, the substrate 101 formed by the first heat-conducting substrate 110 and the second heat-conducting substrate 120 may protect the heating element 130. At the same time, each of the first heat-conducting substrate 110 and the heat-conducting substrate 120 may be a metal sheet. Each of the first heat-conducting substrate 110 and the second heat-conducting substrate 120 may be made of material with better thermal conductivity. For example, each of the first heat-conducting substrate 110 and the heat-conducting substrate 120 may be made of at least one of stainless steel, titanium matrix composite, tungsten matrix composite, titanium and titanium alloy.

The heating element 130 may be a metal sheet. A conductive body of the heating element 130 may be metal that has certain strength and is not easily deformed. The metal conductive body may be made of one or more of nickel-chromium alloy, iron-chromium aluminum alloy, nickel and tungsten. For example, a metal sheet that is self-supporting may be cut or etched to form the conductive body having a predetermined pattern. An insulating layer of the heating element 130 may be formed on a surface of the conductive body by coating, sputtering, or chemical etching and electrophoresis.

The coating may include coating nano-silicon dioxide onto the surface of the conductive body to form the insulating layer. The sputtering may include sputtering nitrides, oxides, carbides, and the like onto the surface of the conductive body to form the insulating layer. The chemical etching and electrophoresis may include immersing the conductive body in phosphate compound solution, and then performing a chemical etching process to form the insulating layer on the surface of the conductive body, or performing an electrophoresis process to form the insulating layer on the surface of the conductive body.

A first end of the substrate 101 may be an insertion portion 1011. The insertion portion may be at least partially inserted into a object that is to be heated to heat the object. A second end of the substrate 101 opposite to the first end has an opening 102, and the heating element 130 may be partially exposed from the opening 102. The part of the heating element 130 exposed from the opening 102 may be electrically connected to an external power supply. The heating element 130 may be powered by the external power supply, such that the heating element 130 may be heated to further heat the object that is to be heated.

In an embodiment, the first heat-conducting substrate 110 may be rectangular. One end of the first heat-conducting substrate 110 may be chamfered to form the insertion portion 1011. The other end of the first heat-conducting substrate 110 may be a flat and flush portion. In other words, the first heat-conducting substrate 110 may include a rectangular portion and a triangular portion configured at an end of the rectangular portion. The recess 111 may also include a rectangular recess and a triangular recess at one end of the rectangular recess. A shape of the second heat-conducting substrate 120 may match the shape of the recess 111.

Figure 3:
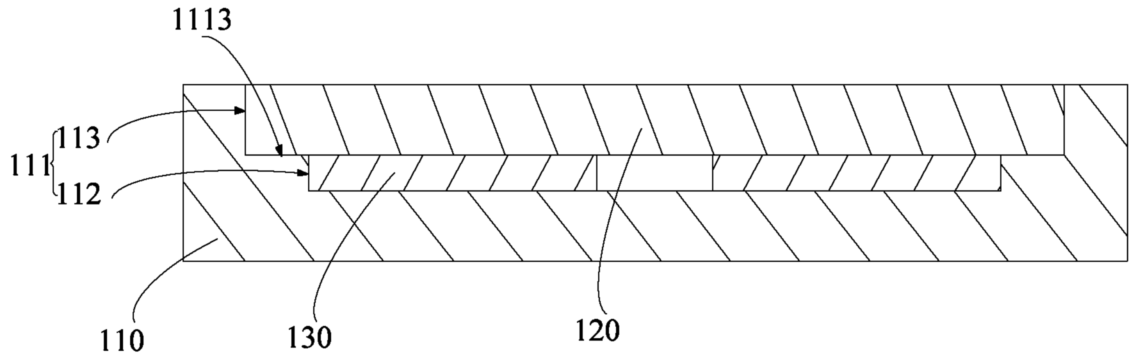
FIG. 3 is a cross section view of the heating body shown in FIG. 1 according to an embodiment of the present disclosure, taken along the line A-A'.

FIG. 3 is a cross section view of the heating body shown in FIG. 1 according to an embodiment of the present disclosure, taken along the line A-A'.

In an embodiment, the recess 111 of the first heat-conducting substrate 110 may be a stepped recess. Specifically, a wall of the recess 111 may have a stepped portion. The recess 111 may include a blind slot 112 and a through slot 113 that communicate with each other. The second heat-conducting substrate 120 may be at least partially received in the through slot 113, such that an inner wall of the blind slot 112 and a surface of the second heat-conducting substrate 120 near the blind slot 112 may cooperatively define the receiving space as described above. The heating element 130 may be at least partially inserted in the receiving space. A wall of the blind slot and a wall of the through slot are connected to each other, serving as the stepped portion of the wall of the recess, the second heat-conducting substrate abuts against the stepped portion In an embodiment, a height of the blind slot 112, which is a depth of the blind slot 112 along a thickness direction of the substrate 101, may be the same as a thickness of the heating element 130, and a height of the through slot 113, which is a depth of the through slot 113 along a thickness direction of the substrate 101, may be the same as a thickness of the second heat-conducting substrate 120.

A part of the first heat-conducting substrate 110 near the second end of the substrate 101 may be exposed relative to the second heat-conducting substrate 120, i.e., the first heat-conducting substrate 110 may extend longer than the second heat-conducting substrate 120, such that the heating element 130 may be partially exposed. Specifically, a length of the second heat-conducting substrate 120 may be configured to be less than a length of the first heat-conducting substrate 110. At a position near the second end of the substrate 101, a side of the heating element 130 near the second heat-conducting substrate 120 may serve as an exposed surface of the heating element 130. The exposed surface may be configured to electrically connect to the external power supply.

The exposed portion of the heating element 130 at the second end of the substrate 101 may be electrically connected to the external power supply through a soldered conductive wire, or connected to the external power supply by other means in other embodiments. A length H of the exposed portion of the heating element 130 at the second end of the substrate 101 may be 2-3 mm. For example, the length H may be 2 mm, 2.5 mm, or 3 mm.

Figure 4:
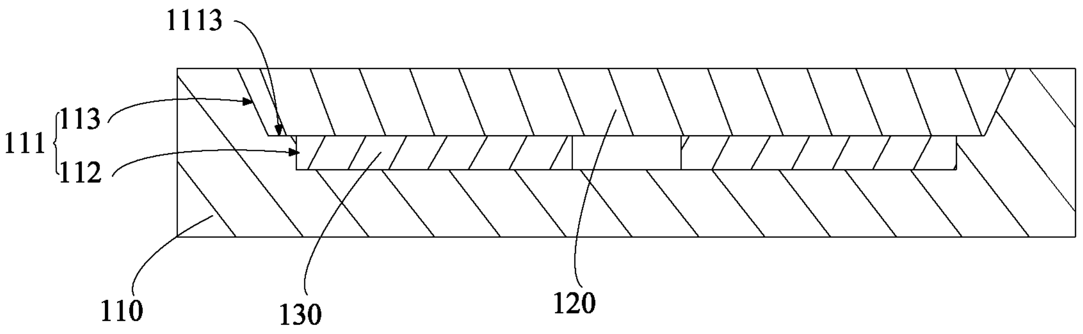
FIG. 4 is a cross section view of the heating body shown in FIG. 1 according to another embodiment of the present disclosure, taken along the line A-A'.

FIG. 4 is a cross section view of the heating body shown in FIG. 1 according to another embodiment of the present disclosure, taken along the line A-A'.

The two opposite side walls of the through slot 113 of the first heat-conducting substrate 110 may be inclined, i.e., an angle between the side wall of the through slot 113 a bottom wall of the through slot 113 may be unequal to 90 degrees. Two side surfaces of the second heat-conducting substrate 120 corresponding to the two side walls of the through slot 113 may also be inclined, i.e., the two side surfaces are parallel to the two side walls of the through slot 113, respectively. When the second heat-conducting substrate 120 is received in the through slot 113, the inclined side surfaces of the second heat-conducting substrate 120 may abut against the two side walls of the through slot 113 to limit a position of the second heat-conducting substrate 120.

Figure 5:
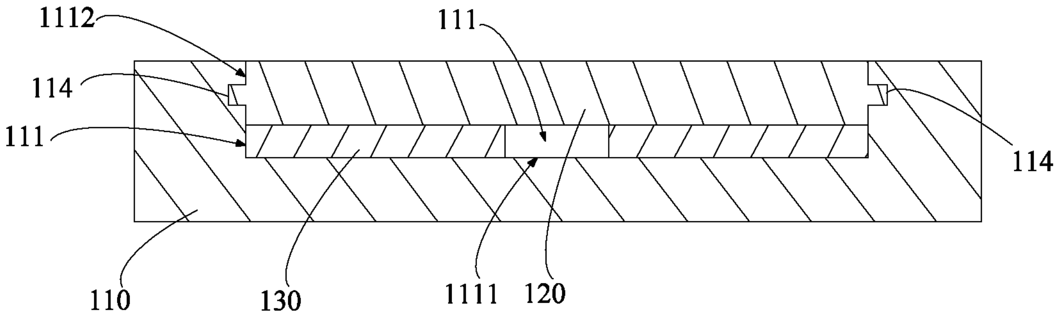
FIG. 5 is a cross section view of the heating body shown in FIG. 1 according to still another embodiment of the present disclosure, taken along the line A-A'.

FIG. 5 is a cross section view of the heating body shown in FIG. 1 according to still another embodiment of the present disclosure, taken along the line A-A'.

The heating body 10 may also include a first heat-conducting substrate 110, a second heat-conducting substrate 120, and a heating element 130. A side of the first heat-conducting substrate 110 may define a recess 111. The second heat-conducting substrate 120 may cover at least a part of an opening of the recess 111. In this way, the first heat-conducting substrate 110 and the second heat-conducting substrate 120 may cooperatively form a substrate 101 having a receiving space. The heating element 130 may be at least partially received in the receiving space. The heating element 130 may include a conductive body and an insulating layer wrapped an outer surface of the conductive body. In this way, the heating element 130 may be insulated from the substrate 101 that is formed by the first heat-conducting substrate 110 and the second heat-conducting substrate 120.

In the present embodiment, the recess 111 of the heating body 10 may have a bottom surface 1111 and two opposite side surfaces 1112. Each of the two opposite side surfaces 1112 may define a groove 114. Two grooves 114 in the two opposite side surfaces 1112 may be defined to face towards each other. Each of two opposite sides of the second heat-conducting substrate 120 may be inserted in one of the two grooves 114. In this way, the first heat-conducting substrate 110 may be connected to the second heat-conducting substrate 120 to form the substrate 101.

The groove 114 on each side surface 1112 may extend from the second end of the substrate 101 to the first end of the substrate 101. The second heat-conducting substrate 120 may be gradually inserted into the first heat-conducting substrate 110 along the groove 114 from the second end or the first end of the substrate 101.

Figure 6:
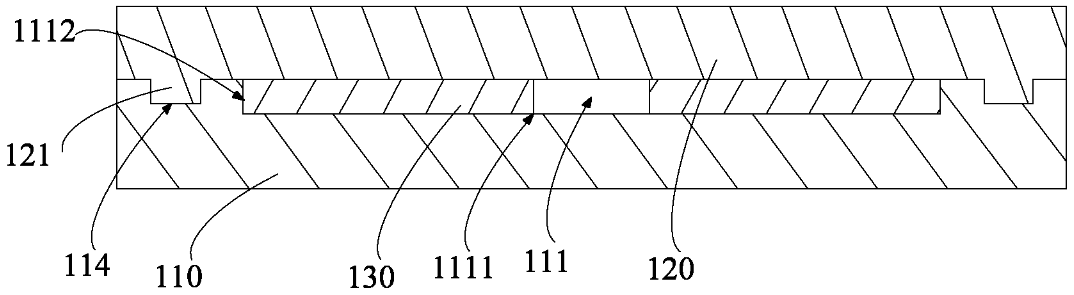
FIG. 6 is a cross section view of the heating body shown in FIG. 1 according to still another embodiment of the present disclosure, taken along the line A-A'.

FIG. 6 is a cross section view of the heating body shown in FIG. 1 according to still another embodiment of the present disclosure, taken along the line A-A'.

Similarly, in the present embodiment, the recess 111 of the heating body 10 may include the bottom surface 1111 and the two opposite side surfaces 1112. The groove 114 may be defined in a surface of the first heat-conducting substrate 110 facing the second heat-conducting substrate 120. An engagement portion 121 may be configured on a side of the second heat-conducting substrate 120 facing the first heat-conducting substrate 110. When the second heat-conducting substrate 120 is disposed on the first heat-conducting substrate 110, the engagement portion 121 on the second heat-conducting substrate 120 may be received into the groove 114, such that the second heat-conducting substrate 120 may be engaged with the first heat-conducting substrate 110.

Figure 7:
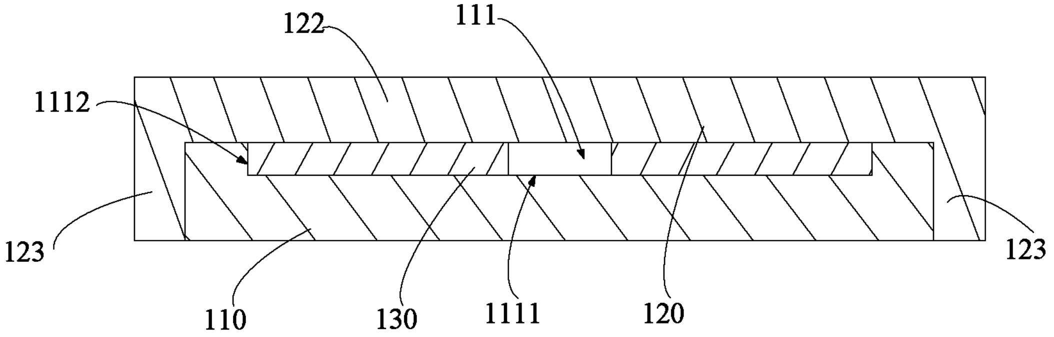
FIG. 7 is a cross section view of the heating body shown in FIG. 1 according to still another embodiment of the present disclosure, taken along the line A-A'.

FIG. 7 is a cross section view of the heating body shown in FIG. 1 according to still another embodiment of the present disclosure, taken along the line A-A'.

In the present embodiment, the recess 111 of the first heat-conducting substrate 110 may include the bottom surface 1111 and the two opposite side surfaces 1112. The second heat-conducting substrate 120 may include a bottom wall 122 and two side walls 123 attached to opposite sides of the bottom wall 122. The bottom wall 122 and the two side walls 123 of the second heat-conducting substrate 120 may cooperatively define a mounting slot.

The first heat-conducting substrate 110 may be received in the mounting slot. In detail, the opening of the recess 111 of the first heat-conducting substrate 110 may face the bottom wall 122 of the second heat-conducting substrate 120. The two side walls 123 of the second heat-conducting substrate 120 may be provided out of two outer surfaces of two opposite side walls of the first heat-conducting substrate 110, respectively. Therefore, the recess 111 of the first heat-conducting substrate 110 and the bottom wall 122 of the second heat-conducting substrate 120 may cooperatively form the receiving space as mentioned above to receive the heating element 130.

In the above embodiment, the first end of the substrate 101 that is formed by the first heat-conducting substrate 110 and the second heat-conducting substrate 120 may be configured as the insertion portion 1011. In other embodiments, the insertion portion 1011 may be formed by the first heat-conducting substrate 110 or the second heat-conducting substrate 120.

Figure 8:
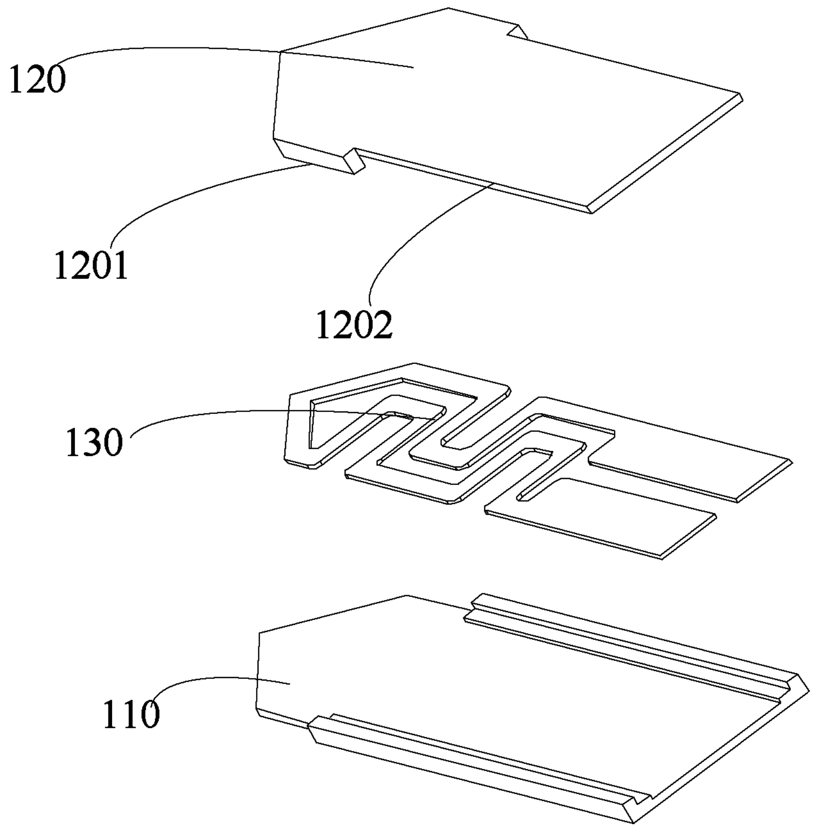
FIG. 8 is an exploded view of the heating body shown in FIG. 1 according to another embodiment of the present disclosure.

As an example, the second heat-conducting substrate 120 may be taken to form the insertion portion 1011. FIG. 8 is an exploded view of the heating body shown in FIG. 1 according to another embodiment of the present disclosure.

The second heat-conducting substrate 120 may include an insertion head 1201 and a mounting portion 1202 connected to the insertion head 1201.

A side of the insertion head 1201 may be a tip end, configured to form the insertion portion as previously described. The mounting portion 1202 may be connected to a side of the insertion head 1201 away from the tip end. A thickness of the mounting portion 1202 may be less than a thickness of the insertion head 1201. The first heat-conducting substrate 110 may be configured at the step formed by the insertion head 1201 and the mounting portion 1202.

When the second heat-conducting substrate 120 is connected to the first heat-conducting substrate 110, the mounting portion 1202 of the second heat-conducting substrate 120 and the recess 111 of the first heat-conducting substrate 110 may cooperatively form the receiving space as described above for receiving the heating element 130. Engagement between the structure of the mounting portion 1202 of the second heat-conducting substrate 120 and the first heat-conducting substrate 110 may be referred to the embodiments shown in FIGS. 3-7, which will not be repeated herein.

Alternatively, as shown in the embodiments in the above, the second heat-conducting substrate 120 and the first heat-conducting substrate 110 may be fixedly connected by welding or glue. For example, the second heat-conducting substrate 120 may be welded to the first heat-conducting substrate 110 by spot welding and the like. Alternatively, the second heat-conducting substrate 120 may be bonded to the first heat-conducting substrate 110 by insulating adhesive that is resistant to heat.

In the present embodiment, the second heat-conducting substrate 120 may be fixed to the first heat-conducting substrate 110 by means of welding. Further, as shown in FIGS. 2-4, when the wall of the recess 111 may have a stepped region, a welding position may correspond to the stepped region 1113 of the wall of the recess 111.

Further as shown in FIG. 1 and FIG. 2, in the present embodiment, a protrusion 103 may be configured on the substrate 101 near the second end, i.e., the rectangular end. The protrusion 103 may be configured to limit a position at which the heating body 10 is configured. In detail, the protrusion 103 may be a protruded boss, configured on the second heat-conducting substrate 120 or the first heat-conducting substrate 110. Alternatively, the protrusion 103 may be at least two protruded bosses. Each of the at least two protruded bosses may be provided on the second heat-conducting substrate 120 or the first heat-conducting substrate 110. Alternatively, one of the at least two protruded bosses may be configured on the second heat-conducting substrate 120, and the rest of the at least two protruded bosses may be configured on the first heat-conducting substrate 110. The protrusion 103 may be configured between the first end and the second end of the substrate 101, and located near the second end of the substrate 101. A region between the second end of the substrate 101 and the protrusion 103 may be defined for mounting, such that the entire heating body 10 may be configured in the electronic atomization device.

Figure 9:
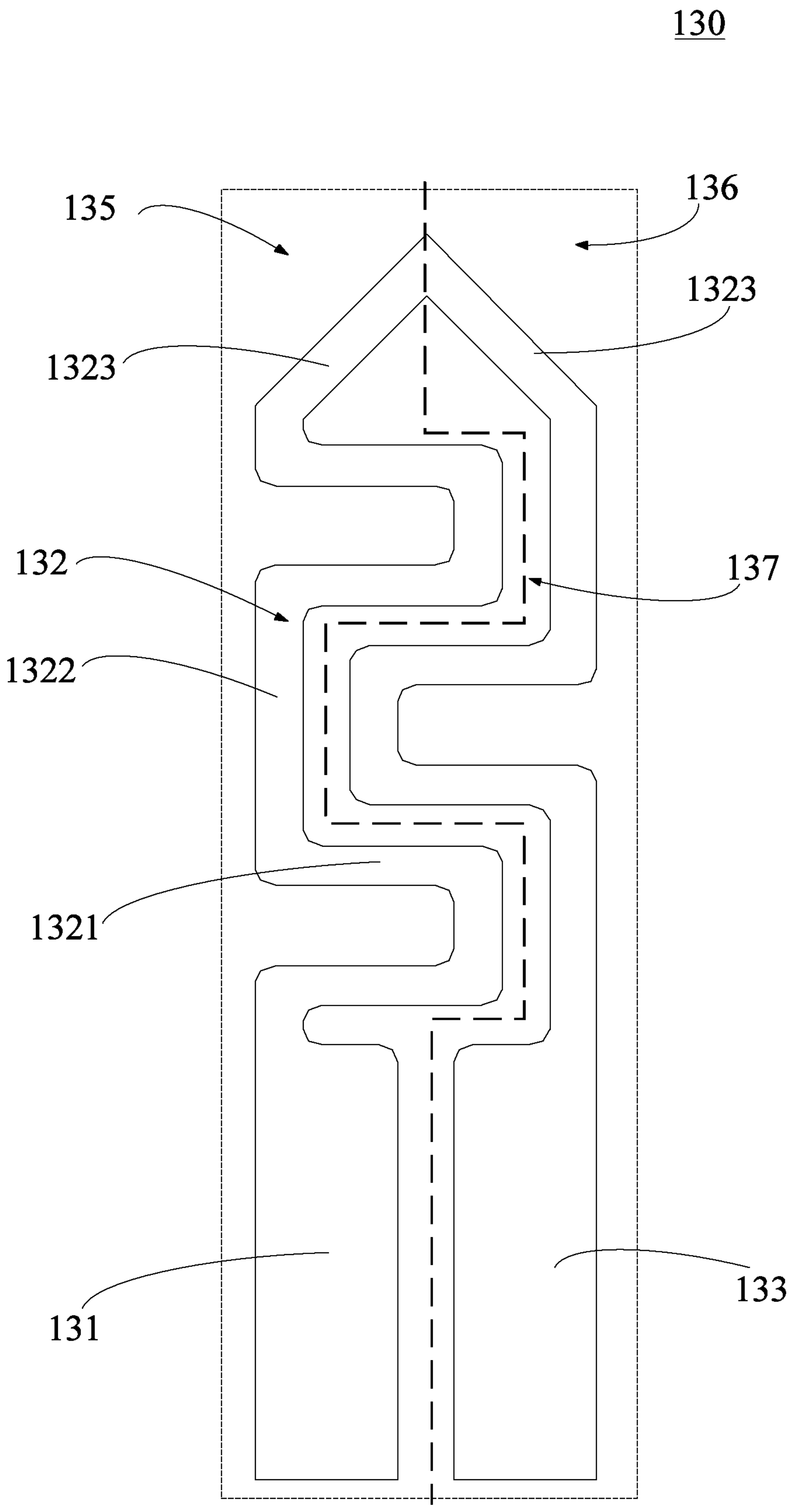
FIG. 9 is a structural schematic view of a heating element of the heating body shown in FIG. 2 according to an embodiment of the present disclosure.

FIG. 9 is a structural schematic view of a heating element of the heating body shown in FIG. 2 according to an embodiment of the present disclosure.

The heating element 130 can be a metal heating sheet that is self-supporting. Specific material of the heating element 130 may be referred to previous embodiments, which will not be repeated hereinafter. The heating element 130 may include a first connection portion 131, a main heating portion 132, and a second connection portion 133, which are connected in sequence.

The first connection portion 131 and the second connection portion 133 may be configured at the second end of the substrate 101, and may be configured side-by-side and spaced apart from each other. The first connection portion 131 and the second connection portion 133 may be exposed from the opening 102. The first connection portion 131 and the second connection portion 133 may be configured to electrically connect to an external power supply, enabling the main heating portion 132 to be electrically connected to the external power supply to generate heat. An impedance of each of the first connection portion 131 and the second connection portion 133 may be less than an impedance of the main heating portion 132. In particular, a cross-sectional area of each of the first connection portion 131 and the second connection portion 133 may be greater than that of the main heating portion 132.

In the present embodiment, in the heating element 130, each the first connection portion 131 and the second connection portion 133 may be only partially exposed to an outside of the receiving space of the substrate 101 from the opening 102. Along a direction from the first end (i.e., the tip end) to the second end (the rectangular end) of the substrate 101, the main heating portion 132 may be configured in the region between the first end of the substrate 101 and the protrusion 103. Therefore, when the main heating portion 132 is conducted to generate heat, the heat emitted from the main heating portion 132 to the second end of the substrate 101 may be reduced, such that the heat utilization of the heating body 10 may be improved.

The main heating portion 132 may be in a continuous folding line. In detail, the main heating portion 132 may include a plurality of transverse heating portions 1321 and a plurality of longitudinal heating portions 1322. The plurality of transverse heating portions 1321 and the plurality of longitudinal heating portions 1322 may be connected to each other alternately.

As shown in FIG. 9, the main heating portion 132 may include a plurality of transverse heating portions 1321 and a plurality of longitudinal heating portions 1322. The main heating portion 132 may be divided into a first sub-heating region 135 and a second sub-heating region 136. Each of the first sub-heating region 135 and the second sub-heating region 136 may include a plurality of transverse heating portions 1321, a plurality of longitudinal heating portions 1322, and at least one diagonal heating portion 1323.

Each of the first sub-heating region 135 and the second sub-heating region 136 may include a diagonal heating portion 1323. Further, ends of two diagonal heating portions 1323 may be connected to match the shape of the tip end of the inversion portion 1011. The two diagonal heating portions 1323 that are connected to each other may be configured at a position corresponding to the insertion portion 1011 to supply heat to a region at which the insertion portion 1011 is configured.

An end of the first sub-heating region 135 away from the diagonal heating portion 1323 may be connected to the first connection portion 131. An end of the second sub-heating region 136 away from the diagonal heating portion 1323 may be connected to the second connection portion 133.

For the first sub-heating region 135, the plurality of transverse heating portions 1321 and the plurality of longitudinal heating portions 1322 configured between the first connection portion 131 and the diagonal heating portion 1323 may be connected to each other alternately. Similarly, for the second sub-heating region 136, the plurality of transverse heating portions 1321 and the plurality of longitudinal heating portions 1322 configured between the second connection portion 133 and the diagonal heating portion 1323 may be connected to each other alternately. A folding groove 137 may be defined between the first sub-heating region 135 and the second sub-heating region 136 and have a uniform width at various position.

Figure 10:
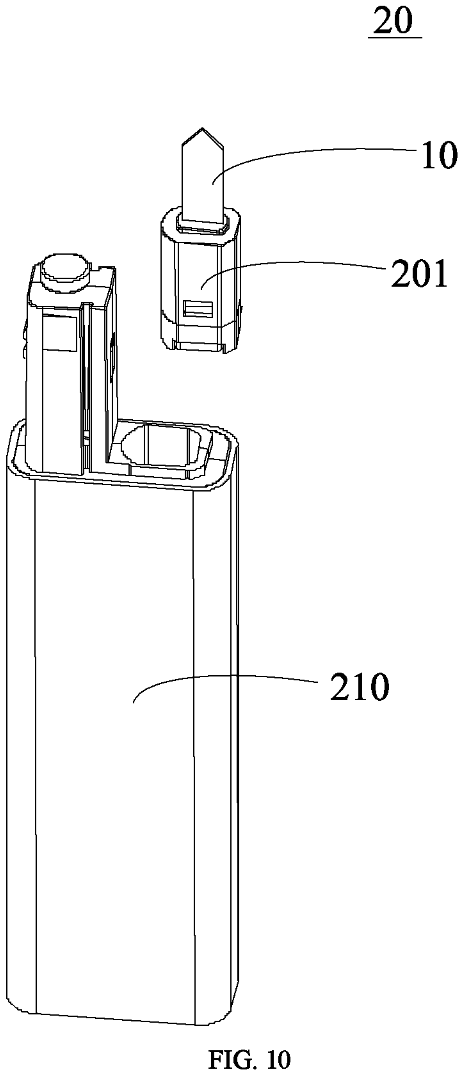
FIG. 10 is a structural schematic view of an electronic atomization device according to an embodiment of the present disclosure.

Further, based on a same invention concept, the present disclosure also provides an electronic atomization device. FIG. 10 is a structural schematic view of an electronic atomization device according to an embodiment of the present disclosure.

The electronic atomization device 20 may include a heating body 10 as described above and an atomization device body 210. The heating body 10 may be mounted on the atomization device body 210 via a mounting base 201. The atomization device body 210 may be provided with a power supply. The power supply may be electrically connected to the heating body 10 to provide power to the heating body 10, such that the heating body 10 may heat and atomize the object that is to be heated. The electronic atomization device 20 may be an electronic cigarette or atomizer, which will not be limited by the present disclosure.

To summarize, it should be understood by a person skilled in the art, the present disclosure provides an electronic atomization device and a heating body thereof. A recess may be defined in the first heat-conducting substrate. A second heat-conducting substrate may at least be partially received in the recess. In this way, the first heat-conducting substrate and the second heat-conducting substrate may cooperatively define a receiving space for receiving a heating element. In this way, a structure of the heating body may be highly stable, highly reliable and have a low cost for assembling. Further, a main heating portion of the heating element may be formed by a plurality of transverse heating portions and a plurality of longitudinal heating portions that are connected to each other alternately. In this way, heat generated by the heating element may be distributed more uniformly.

The above shows only embodiments of the present disclosure, but does not limit the scope of the present disclosure. Any equivalent structure or equivalent process transformation made based on the specification and the accompanying drawings of the present disclosure, applied directly or indirectly in other related arts, shall be included in the scope of the present disclosure.

What is claimed is:

1. A heating body configured for atomizing tobacco or e-liquid, comprising:
- a first heat-conducting substrate, wherein a side of the first heat-conducting substrate defines a recess;
- a second heat-conducting substrate, wherein the second heat-conducting substrate and the first heat-conducting substrate cooperatively forms a substrate having a receiving space; and
- a heating element, received in the receiving space and comprising an electrically conductive body and an insulating layer wrapping an outer surface of the electrically conductive body, such that the heating element is insulated from the substrate.

2. The heating body according to claim 1, wherein
- a wall of the recess has a stepped portion, the recess comprises a blind slot and a through slot that are in communication with each other, the heating element is received in the blind slot, the second heat-conducting substrate is received in the through slot;
- a wall of the blind slot and a wall of the through slot are connected to each other, serving as the stepped portion of the wall of the recess, the second heat-conducting substrate abuts against the stepped portion.

3. The heating body according to claim 2, wherein
- side walls of the through slot have first inclined surfaces, and side walls of the second heat-conducting substrate have second inclined surfaces, the first inclined surfaces correspond to the second inclined surfaces;
- the first inclined surfaces abut against the second inclined surfaces to limit a position of the second heat-conducting substrate in the through slot.

4. The heating body according to claim 1, wherein
- the recess is a blind slot, the second heat-conducting substrate covers the recess to form the substrate cooperatively with the first heat-conducting substrate;
- one of a surface of the first heat-conducting substrate facing the second heat-conducting substrate and a surface of the second heat-conducting substrate facing the first heat-conducting substrate defines an engaging groove, and the other one of the surface of the first heat-conducting substrate facing the second heat-conducting substrate and the surface of the second heat-conducting substrate facing the first heat-conducting substrate is configured with an engaging portion, the engaging portion is received in the engaging groove.

5. The heating body according to claim 1, wherein
- the recess is a blind slot, each of two opposite side walls of the recess defines an engaging groove, and each of two opposite sides of the second heat-conducting substrate is received in the engaging groove.

6. The heating body according to claim 1, wherein
- the recess is a blind slot;
- the second heat-conducting substrate comprises a bottom wall and two opposite side walls connected to the bottom wall;
- the bottom wall covers an opening of the recess, the two opposite side walls are configured out of two opposite sides of the first heat-conducting substrate.

7. The heating body according to claim 1, wherein
- a first end of the substrate is configured to form an insertion portion, the insertion portion is capable of being at least partially inserted into an object that is to be heated;
- a second end of the substrate opposite to the first end has an opening, and the heating element is partially exposed from the opening.

8. The heating body according to claim 7, wherein
- the first heat-conducting substrate extends longer than the second heat-conducting substrate, such that the heating element is partially exposed.

9. The heating body according to claim 7, wherein
- the recess has a bottom surface and two opposite side surfaces, each of the two opposite side surfaces defines an engaging groove, the heating element is configured on the bottom of the recess, the second heat-conducting substrate is received in the engaging groove;
- a part of the second heat-conducting substrate close to the second end is exposed relative to the first heat-conducting substrate, such that the heating element is partially exposed.

10. The heating body according to claim 7, wherein
- the heating element is a metal conductive body;
- each of the first heat-conducting substrate and the second heat-conducting substrate is a metal sheet, a surface of the first heat-conducting substrate away from the second heat-conducting substrate is a smooth surface.

11. The heating body according to claim 10, wherein
- the heating sheet comprises a first connection portion, a main heating portion, and a second connection portion, which are connected in sequence;
- the first connection portion and the second connection portion are configured at the second end of the substrate, configured side-by-side, spaced apart from each other, and are exposed from the opening;
- the first connection portion and the second connection portion are configured to electrically connect to an external power supply, enabling the main heating portion to be electrically connected to the external power supply to generate heat.

12. The heating body according to claim 11, wherein
- the main heating portion comprises a plurality of transverse heating portions and a plurality of longitudinal heating portions, the plurality of transverse heating portions and the plurality of longitudinal heating portions are connected to each other alternately.

13. The heating body according to claim 1, wherein the insulating layer is formed on the outer surface of the electrically conductive body by coating, sputtering, chemical etching, or electrophoresis.

14. An electronic atomization device, comprising a heating body and an atomization device body, wherein
- the heating body is mounted on the atomization device body,
- the atomization device body is provided with a power supply;
- the power supply is electrically connected to the heating body to provide power to the heating body;
- the heating body is configured to heat and atomize an object that is to be heated; and the heating body comprises:

a first heat-conducting substrate, wherein a side of the first heat-conducting substrate defines a recess;

a second heat-conducting substrate, wherein the second heat-conducting substrate and the first heat-conducting substrate cooperatively form a substrate having a receiving space; and a heating element, received in the receiving space and comprising an electrically conductive body and an insulating layer wrapping an outer surface of the electrically conductive body, such that the heating element is insulated from the substrate.

15. The electronic atomization device according to claim 14, wherein the recess is a stepped recess, the recess comprises a blind slot and a through slot that are in communication with each other, the heating element is received in the blind slot, the second heat-conducting substrate is received in the through slot;

the blind slot and the through slot form the stepped recess, the second heat-conducting substrate abuts against the stepped recess.

16. The electronic atomization device according to claim 15, side walls of the through slot have first inclined surfaces, and side walls of the second heat-conducting substrate have second inclined surfaces, the first inclined surfaces correspond to the second inclined surfaces;

the first inclined surfaces abut against the second inclined surfaces to limit a position of the second heat-conducting substrate in the through slot.

17. The electronic atomization device according to claim 14, the recess is blind slot, the second heat-conducting substrate covers the recess to form the substrate cooperatively with the first heat-conducting substrate;

one of a surface of the first heat-conducting substrate facing the second heat-conducting substrate and a surface of the second heat-conducting substrate facing the first heat-conducting substrate defines an engaging groove, and the other one of the surface of the first heat-conducting substrate facing the second heat-conducting substrate and the surface of the second heat-conducting substrate facing the first heat-conducting substrate is configured with an engaging portion, the engaging portion is received in the engaging groove.

18. The electronic atomization device according to claim 14, wherein the recess is a blind slot, each of two opposite side walls of the recess defines an engaging groove, and each of two opposite sides of the second heat-conducting substrate is received in the engaging groove.

19. The electronic atomization device according to claim 14, wherein the recess is a blind slot;

the second heat-conducting substrate comprises a bottom wall and two opposite side walls connected to the bottom wall;

the bottom wall covers an opening of the recess, the two opposite side walls are configured out of two opposite sides of the first heat-conducting substrate.

20. The electronic atomization device according to claim 14, wherein the first heat-conducting substrate extends longer than the second heat-conducting substrate, such that the heating element is partially exposed.

* * * * *